United States Patent [19]
Jacobson et al.

[11] Patent Number: 5,643,592

[45] Date of Patent: *Jul. 1, 1997

[54] SURFACE-COATED PARTICULATE ADDITIVES FOR POLYMERS

[75] Inventors: Howard Wayne Jacobson, Wilmington; Joseph V. Kurian, Seaford, both of Del.; Scott Thomas Sackinger, Columbia, S.C.; Chandrakant Shantilal Shah, Seaford, Del.

[73] Assignee: E. I. Du Pont de Nemours and Company, Wilmington, Del.

[*] Notice: The portion of the term of this patent subsequent to Dec. 21, 2014, has been disclaimed.

[21] Appl. No.: 294,004

[22] Filed: Aug. 22, 1994

Related U.S. Application Data

[63] Continuation of Ser. No. 42,965, Apr. 5, 1993, abandoned, which is a continuation-in-part of Ser. No. 6,022, Jan. 15, 1993, abandoned, which is a continuation of Ser. No. 742,963, Aug. 9, 1991, Pat. No. 5,180,585.

[51] Int. Cl.$^6$ ..................................... A01N 25/26
[52] U.S. Cl. ............... 424/409; 424/405; 424/420; 424/421; 424/419; 523/205; 524/497; 428/328
[58] Field of Search ..................... 424/404, 405, 424/409, 489, 618, 421, 205; 523/215, 216, 515; 524/492–197; 428/328, 329, 331, 336

[56] References Cited

U.S. PATENT DOCUMENTS

| 2,885,366 | 5/1959 | Iler ................................. 252/313 |
| 3,044,901 | 7/1962 | Garnowordy ..................... 117/212 |
| 3,505,088 | 4/1970 | Luginsland ....................... 106/308 |
| 3,694,321 | 9/1972 | Durrant et al. .................... 106/300 |
| 4,085,080 | 4/1978 | Elbert ............................ 260/31.2 N |
| 4,443,573 | 4/1984 | Wells et al. ..................... 524/308 |
| 5,122,418 | 6/1992 | Nakane et al. .................... 424/401 |

FOREIGN PATENT DOCUMENTS

| 678447 | 1/1966 | Belgium . |
| 0 232 219 A1 | 8/1987 | European Pat. Off. .......... C07C 1/20 |
| 0392262 | 10/1990 | European Pat. Off. . |
| 0 496 150 A2 | 9/1991 | European Pat. Off. .......... C09C 3/08 |
| 1467479 | 12/1968 | Germany . |
| 661 741 A5 | 8/1987 | Switzerland ................... C09B 67/08 |

*Primary Examiner*—Neil S. Levy

[57] ABSTRACT

Finely-divided particulate additives for polymers with a surface coating comprised of a compound selected from the group consisting of esters of difunctional $C_6$–$C_{40}$ aliphatic and aromatic carboxylic acids and triesters of phosphoric acid.

7 Claims, No Drawings

SURFACE-COATED PARTICULATE ADDITIVES FOR POLYMERS

This invention is a continuation of patent application Ser. No. 08/042,965, filed Apr. 5, 1993, now abandoned, which is a continuation-in-part of patent application Ser. No. 08/006,022, filed Jan. 15, 1993, now abandoned, which is a continuation of patent application Ser. No. 07/742,963, filed Aug. 9, 1991, now U.S. Pat. No. 5,180,585.

BACKGROUND OF THE INVENTION

This invention relates to particulate additives for polymers comprising finely-divided particles with a surface coating to improve dispersibility and/or serve as a protective coating.

A wide variety of finely-divided particulate materials are known for use as additives for incorporation into polymers. These finely-divided particulate materials include, for example, $TiO_2$ used as a white pigment or delustrant, colored pigments, and inorganic particles which can impart electrical conductivity. Many of these finely-divided particulates are difficult to disperse into polymers and poor polymer quality may result from inadequate dispersion.

Some types of finely-divided particulate additives have inorganic surface coatings to impart specialized characteristics to the additives. A problem encountered in the use of such finely-divided particulate additives is the leaching of materials from the inorganic surface coatings which can cause problems during procedures for dispersing the particles into the polymer. In addition, some materials which leach from the particles can cause problems in subsequent melt processing operations, particularly when the polymer is used for fiber manufacture. For example, one type of $TiO_2$ especially suitable for use as a delustrant in fibers has coatings of $SiO_2$, $Al_2O_3$, manganese, and phosphate which avoid a direct contact between the polymer and the active $TiO_2$ surface. Furthermore, the manganese coating suppresses undesirable photocatalytic reactions in the polymer providing the yarns with better lightfastness and stability. However, during preparation of an aqueous additive slurry for incorporation into polymer such as polyamides and polyesters prepared from aqueous solutions, it has been discovered that the inorganic elements in the coatings, especially manganese, leach from the additive into the water thereby decreasing light stabilization. In addition, the presence of these elements in the polymer causes deposits in the polymerization reactor and such deposits cause problems in the manufacture of fibers such as increased filament breaks, excessive pack pressures, spinneret plugging, etc.

Another type of $TiO_2$ known to cause problems in fiber manufacture has a coating of $SnO_2$, $Sb_2O_3$, and $SiO_2$ and is used to impart electrical conductivity (antistatic properties) to sheath/core nylon fiber. It has been learned that this type of $TiO_2$ holds a high level of moisture and, when the $TiO_2$ is added to a polymer such as nylon by melt blending, the moisture is released into the polymer thereby decreasing polymer viscosity which causes spinning difficulties.

Surface coatings of, e.g., triethanolamine, trimethanol propane, or polydimethylsiloxane have been used on finely-divided particulate additives. However, such known coatings have not been as effective in providing the desired degree of dispersibility for many applications. Coatings of trifunctional compounds such as triethanolamine are believed to be undesirable for use in polymers such as polyamides since they can cause branching thereby degrading the polymer. Moreover, known coatings have not provided an adequate protective coating, particularly for particles with one or more inorganic surface coatings.

SUMMARY OF THE INVENTION

We have now discovered that finely-divided particulate additives, particularly those with inorganic coatings on their surface, can be improved by employing a surface coating in accordance with the invention. The surface coating is comprised of a compound selected from the group consisting of esters of difunctional $C_6$–$C_{40}$ aliphatic and aromatic carboxylic acids and triesters of phosphoric acid.

In one preferred form of the invention, the compound of the surface coating comprises $C_8$ diesters of azelaic acid. Most preferably, the compound of the surface coating comprises a compound selected from di(n-octyl)azelate, di(2-ethyl hexyl)azelate and mixtures thereof.

The additive in accordance with the invention provides improved polymeric compositions incorporating the particulate additive. The compositions can provide improved dispersion of the additive in the polymer and are especially useful in the manufacture of synthetic fibers and can reduce the rate of pack pressure rise thereby reducing the filament break level. Compositions containing antistatic additives in accordance with the invention are less prone to moisture absorption problems.

DETAILED DESCRIPTION

The invention is useful with a variety of particulate additives for use as additives for incorporation into polymers. These finely-divided particulate materials include, for example, $TiO_2$ used as a white pigment or delustrant, colored pigments, and inorganic particles which can impart electrical conductivity. The invention is particularly useful with particulate additives which have inorganic surface coatings which impart specialized characteristics to the particulate additives.

The invention is particularly useful for $TiO_2$ particles with an inorganic surface coating. An especially preferred $TiO_2$ of this type has inorganic coatings which comprise, based on the weight of the additive, 0.01 to 1.5% of $SiO_2$, and 1 to 3% $Al_2O_3$, 0.01 to 1% manganese, and 0.01 to 2% phosphate. $TiO_2$ of this type is sold by Sachtleben Chemie of Duisburger Strasse 99, 4100 Duisburg 17 (Homburg), Duisburg, West Germany, under the tradename LOCR SM. The coatings avoid a direct contact between the polymer and the active $TiO_2$ surface and the manganese suppresses undesirable photocatalytic reactions in the polymer providing the yarns with better lightfastness and stability.

Another preferred type of $TiO_2$ has inorganic surface coatings which impart electrical conductivity. One or more coatings of, for example, $SnO_2$/$Sb_2O_5$, ZnO or $SnO_2$ can be used. An especially preferred $TiO_2$ of this type has inorganic surface coatings which comprise 30 to 40% $SnO_2$, 3 to 5% $Sb_2O_3$, and 2 to 4% $SiO_2$.

Colored pigments for use in accordance with the invention include, for example, iron oxide, lead chromate, bismuth vanadate and other known pigments for use in coloring polymers.

Examples of particulate additives for imparting antitackiness properties to polymers, especially elastomeric polymers for use in the manufacture of fiber are clays, micas and talc.

The invention is effective with particulate additives having a wide range of particle size. Preferably, the average diameter of the finely-divided particles is about 0.01 to about 100 microns, most preferably, about 0.1 to about 5 microns.

The surface coating is comprised of a compound selected from the group consisting of esters of difunctional $C_6$–$C_{40}$ aliphatic and aromatic carboxylic acids and triesters of phosphoric acid. Examples of difunctional $C_6$–$C_{40}$ aliphatic and aromatic carboxylic acids are dioctyl azelate, dialkyl phthalate, dialkyl adipate, dialkyl sebacate, dioctyl terephthalate, dinonyl phthalate, di-iso-octyl adipate, di-iso-octyl sebacate, tritolyl phosphate, trixylenyl phosphate, trioctyl phosphate, polypropylene adipate, polypropylene laurate, polypropylene sebacate, benzyl butyl phthalate, dibutyl phthalate, dibutyl adipate, dibutyl sebacate, dihexyl adipate, dihexyl sebacate, dihexyl phthalate, dicyclohexyl phthalate, dicyclohexyl sebacate, diphenyl adipate, and diisooctyl adipate. Examples of triesters of phosphoric acid are tricresyl phosphate and tritolyl phosphate. Preferably, the compound of the surface coating comprises $C_8$ diesters of azelaic acid. Most preferably, the compound of the surface coating comprises a compound selected from di(n-octyl) azelate ("DOZ"), di(2-ethyl hexyl)azelate and mixtures thereof.

The coating can be applied to a particulate additive by intimately mixing the surface coating compound with the additive. This can be accomplished by mixing the particulate and coating compound in a V-blendor and subsequently feeding the additive to a micronizer. A micronizer is a fluid energy mill operated with super-heated steam which increases the uniformity of distribution of the coating on the surface of the particles. Typically, the micronizer is operated with approximately three parts by weight of steam per one part by weight of particulate additive. When the surface coating compound is a liquid, the particulate and coating compound also can be simultaneously fed to the micronizer. Alternately, the coating can be applied by adding and thoroughly mixing the surface coating compound into an aqueous slurry of the additive. For some uses, it is not necessary to recover the additive from the slurry if the slurry is used, for example, in the incorporation of the additive into the polymer. Preferably, the compound of the surface coating is used in sufficient quantity that it comprises 0.05 to about 3% by weight of the additive.

The particulate additives can be dispersed in a variety of organic polymers to form polymeric compositions containing the additive. Possible polymers are polyolefins, vinyl polymers, fluorocarbon polymers, polyurethanes, segmented polyurethane elastomers, polyethers, polysulfides, polysulfones, polysiloxanes, and cellulosic polymers. In preferred compositions, the organic polymers are homopolymers and copolymers of polyamides and homopolymers and copolymers of polyesters. Most preferred polyamides comprise at least about 85% of a polyamide selected from the class consisting of poly(hexamethylene adipamide) and poly (ε-caproamide).

The preferred compositions are especially useful in the manufacture of synthetic fibers and can reduce the rate of pack pressure rise as the polymer is filtered in advance of spinning and thereby reduce the filament break level. Compositions containing antistatic additives in accordance with the invention are less prone to moisture absorption problems.

Embodiments of the invention are illustrated in the following examples. Concentrations and percentages are by weight unless otherwise indicated.

EXAMPLE 1

This example employs $TiO_2$ having coatings comprising 0.01 to 1.5% of $SiO_2$, and 1 to 3% $Al_2O_3$, 0.01 to 1% manganese, and 0.01 to 2% phosphate, based on the weight of the additive, which sold by Sachtleben under the tradename LOCR SM. Batches of this $TiO_2$ are provided with a coating of di(n-octyl)azelate (DOZ) which constitutes the percentages by weight of the $TiO_2$ indicated in the following Table 1. The coating is applied by V-blending the appropriate quantity of DOZ with the $TiO_2$ and then passing the additive though a steam micronizer at a rate of three parts by weight steam per part $TiO_2$.

TABLE 1

| Batch | Di(n-octyl)azelate (Wt. %) |
|---|---|
| 1 | 0 |
| 2 | 0.55 |
| 3 | 0.85 |

Using the quantities indicated in Table 2, a slurry of each batch is prepared in a standard high intensity mixer with a milling time of 60 minutes. Slurry stability is monitored using the filtration and viscosity tests. Final slurry concentration is 25% and the pH is 8.15. Good slurry stability is obtained from all batches.

TABLE 2

| | Slurry 1 | Slurry 2 | Slurry 3 |
|---|---|---|---|
| High quality water | 1132 lbs (515 kg) | 1132 lbs (515 kg) | 1132 lbs (515 kg) |
| KTPP dispersant | 450 g | 450 g | 450 g |
| LOCR SM $TiO_2$ with no DOZ | 440 lbs (200 kg) | — | — |
| LOCR SM $TiO_2$ with 0.55% DOZ | — | 440 lbs (200 kg) | — |
| LOCR SM $TiO_2$ with 0.85% DOZ | — | — | 440 lbs (200 kg) |

Fifty ml portions of each slurry are centrifuged in a high speed centrifuge (6000 r.p.m., Beckman Centrifuge) for 50 minutes and the clear solution is collected and analyzed for various elements using the ICP atomic absorption technique. The results reported in parts-per-million (ppm) are summarized in Table 3.

TABLE 3

| Element (in ppm) | Slurry 1 (Control) | Slurry 2 (0.55% DOZ) | Slurry 3 (0.85% DOZ) |
|---|---|---|---|
| Mn | 22 | 3 | 3 |
| Al | 3 | 1 | 1 |
| P | 130 | 55 | 36 |
| Ti | 2 | 3 | 1 |
| Na | 135 | 110 | 110 |
| K | 125 | 105 | 130 |
| Mg | 1 | <1 | <1 |

As can be seen from above Table 3, the use of DOZ has a significant effect in preventing the surface elements of $TiO_2$, especially manganese, aluminum, and phosphorous from being stripped from the additive. It is believed that DOZ is protecting the surface of the $TiO_2$.

EXAMPLE 2

This example also employs $TiO_2$ sold by Sachtleben under the tradename LOCR SM. However, the DOZ is not coated on the $TiO_2$ but instead is added directly to the mixing mill during slurry preparation. Three slurry batches are prepared using ingredients added in the order given in Table 4 below. The milling time is 60 minutes.

TABLE 4

|  | Batch #1 | Batch #2 | Batch #3 |
| --- | --- | --- | --- |
| HQ water | 1132 lbs (515 kg) | 1132 lbs (515 kg) | 1132 lbs (515 kg) |
| KTPP dispersant | 450 g | 450 g | 450 g |
| DOZ | 0 g | 1500 g | 1500 g |
| LOCR SM TiO$_2$ | 440 lbs (200 kg) | 440 lbs (200 kg) | 440 lbs (200 kg) |
| Kathon biocide | 8 ppm | 8 ppm | 0 |

Twenty ml portions of the slurry are centrifuged inside a high speed centrifuge for 20 minutes (6000 r.p.m., Beckman centrifuge), the clear liquid is decanted, collected and analyzed for elements using the ICP atomic absorption technique. Results are summarized in Table 5.

TABLE 5

| Element (in ppm) | Batch #1 (Control) | Batch #2 | Batch #3 |
| --- | --- | --- | --- |
| Mn | 24 | 16 | 16 |
| Al | 10 | <5 | <5 |
| P | 190 | 180 | 170 |
| Ti | 39 | 59 | 30 |
| Na | 98 | 110 | 110 |
| K | 245 | 250 | 220 |
| Mg | 22 | 20 | 21 |

Elemental results again indicate that the presence of DOZ in the slurry is helpful in protecting TiO$_2$ surface elements such as manganese, aluminum, and phosphorous. It is believed that an adsorbed monolayer of DOZ on the TiO$_2$ pigment is protecting those elements.

EXAMPLE 3

TiO$_2$ of the same type prepared as in Example 1 (micronized with DOZ) is used in this example. Three slurry preparations are made in a stainless steel beaker equipped with a high speed mixer. 576 g of high quality water is added to the beaker, followed by 0.5 g of KTPP. The solution is mixed for 30 seconds and 224 g of LOCR SM TiO$_2$ pigment are added. The slurry is well mixed for 15 minutes. The following describes the constituents and conditions used for the three batches.

TABLE 6

|  | Batch #1 | Batch #2 | Batch #3 |
| --- | --- | --- | --- |
| HQ water | 576 g | 576 g | 576 g |
| KTPP dispersant | 0.5 g | 0.5 g | 0.5 g |
| LOCR SM TiO$_2$ | 224 g | — | — |
| LOCR SM TiO$_2$ with 0.55% DOZ | — | 224 g | — |
| LOCR SM TiO$_2$ with 1% DOZ | — | — | 224 g |

Slurry characteristics are measured and Table 7 summarizes the measured properties. Overall, the slurry stability is very good.

TABLE 7

|  | Batch #1 | Batch #2 | Batch #3 |
| --- | --- | --- | --- |
| PH | 7.96 | 7.76 | 7.05 |
| Percent TiO$_2$ | 28.30 | 28.04 | 28.62 |
| Brookfield viscosity (cp) | 4.1 | 3.1 | 3.6 |

Portions of the slurry are centrifuged for 50 minutes inside a high speed centrifuge (6000 r.p.m., Beckman centrifuge), the clear solution is collected, and analyzed for various elements by the ICP atomic absorption technique. Results are summarized in Table 8.

TABLE 8

| Element (in ppm) | Batch #1 (Control) | Batch #2 | Batch #3 |
| --- | --- | --- | --- |
| Mn | 17 | 9 | 2 |
| Al | 2 | 2 | 1 |
| P | 120 | 84 | 19 |
| Na | 115 | 115 | 165 |
| K | 105 | 125 | 165 |
| Si | 14 | 16 | 25 |

Here again, elemental results clearly suggest that DOZ is effective in protecting the TiO$_2$ surface elements, especially, manganese, aluminum and phosphorous.

EXAMPLE 4

The following is an example of this invention employing multipolymer nylon composition to spin continuous filament yarns delustered with TiO$_2$. This nylon has an RV of 42 and is comprised by weight of 90% 6,6 nylon and 5% 2-methylpentamethylene adipamide (MPMD-6), and 5% 6 nylon polymer. The polymer is spun into 40 denier 13 filament trilobal (nominal 1.5 mod ratio) yarns. A control is run using this polymer containing 1.6% TiO$_2$ pigment as purchased from Sachtleben under the tradename LOCR SM. An example of the invention employed the same TiO$_2$ with 0.55% DOZ applied using the procedure of Example 1.

These yarns are processed in a one step process that produces interlaced and stabilized yarns from a 160° C. heat stabilization process. Polymer changes are made to keep the polymer viscosity as constant as possible for the experiment.

Statistically based sampling of these yarns collected during the experiment are dyed with C.I. Acid Blue 40 (level dyeing procedure) and C.I. Acid Blue 122 (structure sensitive procedure). The lower dye variability, particularly in smaller C.I. Acid Blue 40, illustrates the advantage of employing DOZ.

TABLE 10

|  | Control Pigment | 0.55% DOZ coated pigment |
| --- | --- | --- |
| Acid blue 40 sigma, n = 32 (corrected to 180 average dye level for numbers) | 3.81 | 2.18 |
| Acid blue 122 sigma, n = 96 (corrected to 180 average dye level for numbers) | 3.05 | 2.81 |

EXAMPLE 5

This example illustrates the invention using an electrically conducting pigment (TiO$_2$ coated with tin (IV) oxide at a level of 30 to 34% doped with $Sb_2O_3$ at 3 to 5% and a $SiO_2$ layer at 2 to 4%) in a sheath-core fiber. The use of the invention improves the performance of spinning bicomponent anti-static polyamide fibers.

It is known that flow instabilities within the spinneret capillary and at the exit from the capillary can occur in bicomponent sheath-core fiber spinning. When the fiber core polymer viscosity drops below that of the sheath viscosity flow instability dominates the process and random fluctuations of filament diameter results. Using an additive as described above, it is observed that core polymer viscosity drops due to moisture on the surface of the anti-stat pigment under spinning conditions.

A control sheath-core fiber is made using three anti-stat pigment compositions employing the pigment as described above, containing core polyamides of varying polymer relative viscosity. In each case, the sheath polymer (nylon 66 homopolymer) has a relative viscosity of 40 and contained no anti-stat pigment. The polyamides of the core are an amorphous polyamide sold by E. I. du Pont de Nemours and Company under the tradename ELVAMIDE® and has polymer relative viscosities of 23, 40 and 63. Each core polyamide is loaded with anti-stat pigment to a level of 65 weight percent and no hydrophobic coating is applied to the anti-stat pigment used in each case. Attempts are made to spin sheath-core fibers using each of the core polyamides but polymer flow instabilities would not allow fiber spinning to proceed.

To illustrate the benefits of the invention, the same core polyamides are used and this time the anti-stat pigment is coated with DOZ. The anti-stat pigment is V-blended with 1% DOZ and then passed through a steam micronizer at a rate of three parts by weight steam per part anti-stat pigment. The use of the di(n-octyl)azelate coating effectively eliminates the flow instability observed for the uncoated anti-stat pigment.

What is claimed is:

1. A polymeric composition comprising
   an organic polymer selected from the group consisting of polyamides, polyesters, polyolefins, vinyl polymers, fluorocarbon polymers, polyurethanes, segmented polyurethane elastomers, polyethers, polysulfides, polysulfones, polysiloxanes, and cellulosic polymers, said organic polymer incorporating a particulate additive consisting of finely-divided particles having an average diameter of about 0.01 to about 100 microns and being selected from the group consisting of $TiO_2$ with at least an inorganic surface coating, colored pigments substantially free of metal chromate, antitackiness additives for elastic polymers, and inorganic particles which impart electrical conductivity to polymers, said finely-divided particles having an organic surface coating comprised of a compound selected from the group consisting of $C_8$ diesters of azelaic acid and mixtures thereof, said compound of said organic surface coating comprising about 0.05 to about 3% by weight of said particulate additive.

2. The polymeric composition of claim 1 wherein the average diameter of said finely-divided particles is about 0.1 to about 5 microns.

3. The polymeric composition of claim 1 wherein said finely-divided particles comprise $TiO_2$ with an inorganic surface coating.

4. The polymeric composition of claim 3 wherein said inorganic surface coating comprises, based on the weight of the additive, 0.01 to 1.5% of $SiO_2$, and 1 to 3% $Al_2O_3$, 0.01 to 1% manganese, and 0.01 to 2% phosphate.

5. The polymeric composition of claim 3 wherein said inorganic surface coating comprises, based on the weight of the additive, 30 to 40% $SnO_2$, 3 to 5% $Sb_2O_3$, and 2 to 4% $SiO_2$.

6. The polymeric composition of claim 1 wherein said compound of said organic surface coating comprises a compound selected from di(n-octyl)azelate, di(2-ethyl hexyl)axelate and mixtures thereof.

7. The polymeric composition of claim 1 wherein said organic polymer is selected from the group consisting of a polyamide homopolymer, a polyamide copolymer, a polyester homopolymer and a polyester copolymer.

* * * * *